United States Patent [19]

Fuchs

[11] Patent Number: 4,715,958

[45] Date of Patent: * Dec. 29, 1987

[54] PROCESS AND MEANS FOR CONDUCTING THE DENITRIFICATION OF WATER

[75] Inventor: Uwe Fuchs, Munich, Fed. Rep. of Germany

[73] Assignee: Linde Aktiengesellschaft, Wiesbaden, Fed. Rep. of Germany

[*] Notice: The portion of the term of this patent subsequent to Sep. 4, 2001 has been disclaimed.

[21] Appl. No.: 788,705

[22] Filed: Oct. 21, 1985

Related U.S. Application Data

[63] Continuation of Ser. No. 525,360, Aug. 22, 1983, abandoned.

[30] Foreign Application Priority Data

Aug. 28, 1982 [DE] Fed. Rep. of Germany ....... 3232095

[51] Int. Cl.$^4$ .............................. C02F 3/08; C02F 3/10
[52] U.S. Cl. .................................... 210/605; 210/610; 210/630; 210/616; 210/504
[58] Field of Search ............... 210/605, 630, 610, 617, 210/611, 618, 616, 615, 150, 151, 903, 502.1, 504, 506

[56] References Cited

U.S. PATENT DOCUMENTS

| 4,039,438 | 8/1977 | Anderson | 210/903 |
| 4,043,936 | 8/1977 | Francis | 210/903 |
| 4,209,390 | 6/1980 | Cabane et al. | 210/903 |
| 4,225,430 | 9/1980 | Bosman | 210/903 |
| 4,427,548 | 1/1984 | Quick, Jr. | 210/150 |
| 4,469,600 | 9/1984 | Frydman et al. | 210/610 |

FOREIGN PATENT DOCUMENTS

| 4304 | 10/1979 | European Pat. Off. | |
| 46901 | 3/1982 | European Pat. Off. | 210/617 |
| 2476629 | 8/1981 | France | 210/903 |
| 2082164 | 3/1982 | United Kingdom | 210/617 |

OTHER PUBLICATIONS

Hawkins, J. E. et al.; "Denitrification of Sewage Effluent by Attached Growth Technique"; found in: *New Process of Waste Water Treatment and Recovery;* pp. 107–127 (1978).

*Primary Examiner*—Benoit Castel
*Attorney, Agent, or Firm*—Millen & White

[57] ABSTRACT

In a denitrification process wherein denitrifying agents are supported on a carrier material, the invention comprises conducting denitrification in the presence of a carrier impregnated with an organic substance capable of serving as a reducing agent for the denitrifying agents. In another aspect the invention relates to a method of preparing such a carrier and to the carrier itself.

15 Claims, No Drawings

PROCESS AND MEANS FOR CONDUCTING THE DENITRIFICATION OF WATER

This application is a continuation of application Ser. No. 525,360, filed Aug. 22, 1983, now abandoned.

BACKGROUND OF THE INVENTION

This invention relates to a process for the denitrification of water containing nitrogen in the form of nitrates and nitrites, which is at least substantially free of carbon, and wherein the water to be denitrified is passed through a reactor containing a carrier material for supporting denitrifying agents thereon. In another aspect, the invention relates to a method of preparing a carrier for use in the denitrification of water substantially free of carbon, and to the carrier itself.

In the prior art, it is known to eliminate nitrogen contained in sewage water in biological clarifier installations by nitrification and denitrification. In the process of nitrification, which primarily occurs only after extensive oxidation of carbon compounds present, and which requires low sludge loads, an adequate supply of oxygen and long sludge residence times, nitrogen in the form of ammonia is converted by autotrophic bacteria into nitrates and nitrites. In denitrification, nitrates and nitrites are reduced to elemental nitrogen under anoxic conditions. This reduction is effected by facultative anaerobic bacteria, e.g., facultative anaerobic heterotrophs with the principal genera being Pseudomonas, Micrococcus, Achromobacter and Bacillus, through an electron transport system whereby nitrates and nitrites are reduced by the use thereof as an electron acceptor. The denitrifying bacteria are thus capable of extensively oxidizing organic substrates without requiring molecular oxygen, and thereby acquire energy, and in turn, the denitrifying bacteria grow while utilizing organic matter for synthesis.

In the theoretical overall denitrification process, organic substances are oxidized by nitrites and nitrates into carbon dioxide and water. Consequently, in order to achieve extensive reduction of nitrates into molecular nitrogen, an adequate supply of organic carbon must be provided. In the prior art, one source of carbon has been raw sewage supplied to a clarifier installation. Another source of carbon has been a separately introduced carbon containing substrate, for example, methanol.

The denitrification is typically effected, in one case, in an anoxic zone preceding an activation zone and a nitrification zone, and which optionally contains a carrier material for supporting the denitrifying agents, i.e., microorganisms in this case, and is known as an attached growth process. An adequate supply of carbon is maintained, in the case wherein the anoxic zone precedes the activation and nitrification zone, by the influx of raw sewage, and the flow of sewage containing nitrates and nitrites and free of carbon, is recirculated from the nitrification zone into the anoxic zone. Alternatively, an anoxic zone is arranged following the nitrification zone, and also optionally containing a carrier material for the denitrifying microorganisms, and with a dosage of raw sewage containing BOD (biochemical oxygen demand) provided as the source of carbon.

However, the recirculating process requires large scale, energy intensive recycle conditions, and leads as the result of the placement in front of the anoxic zone, to a deterioration in the degree of nitrogen elimination in the sewage treatment plant taken as a whole. If the anoxic zone is inserted as a followup to the nitrification zone, the requirement of adding a carbon containing substrate is detrimental to the $BOD_5$ (five-day biochemical oxygen demand) of the runoff, and furthermore, the precise metering required is difficulte to achieve because the effects of overfeeding are not seen until sometime after it has occurred. These two processes thus cannot be effectively and efficiently applied to the recovery of drinking water. For more details regarding the specific details of the denitrification process, see *Wastewater Engineering, Treatment/Disposal/Reuse*, 2d ed., Metcalf and Eddy Inc., McGraw Hill at page 727-734, whose disclosure is incorporated herein by reference.

SUMMARY OF THE INVENTION

It is thus an object of the invention to provide a process of the aforementioned type wherein an extensive elimination of nitrogen is achieved in a simple and economical manner and another object is to produce a high runoff quality of the treated water.

It is still another object to provide such a process wherein denitrifying agents, i.e., microorganisms, are supported on a specially prepared carrier which eliminates the need to maintain a carbon supply, and which does not raise the $BOD_5$ of the water being treated.

It is still another object to provide a method of preparing such a carrier material.

Yet still another object is to provide a carrier material for use in an attached growth denitrification process which eliminates the requirement of maintaining or supplying a minimum amount of carbon in water being treated.

Upon further study of the specification and appended claims, further objects and advantages of this invention will become apparent to those skilled in the art.

In a process for the denitrification of influent water which is substantially free of carbon, wherein said water is passed through a reactor containing denitrifying microorganisms, (hereinafter called denitrifying agents) supported on a carrier, the invention comprises treating the water to be denitrified in the reactor in the presence of a carrier material impregnated with organic substances which serve as a carbon source for the denitrifying microorganisms. By water "substantially free of organic carbon" is meant a water having a COD-content of about 1 to 200 mg/l especially of about 1 to 50 mg/l. If the COD is biological degradable then in the resulting effluent of the reactor the COD content is zero, whereas otherwise the COD content in the effluent corresponds to that of the influent of the reactor.

In another aspect, the invention comprises a method of preparing a carrier material for use in a denitrification process by impregnating the carrier material, prior to being contacted by the water to be denitrified in a reactor, with organic substances which will serve as carbon sources for denitrifying bacteria to be supported thereon.

In still another aspect, the invention comprises a carrier material for use in a denitrification process, which carrier material comprises a carrier material adapted for supporting denitrifying bacteria thereon, with said carrier material being impregnated with an organic substance.

DETAILED DESCRIPTION OF THE INVENTION

This invention provides that, by impregnating a carrier material with organic substances, deterioration of the runoff $BOD_5$ may be avoided in an unexpectedly simple manner, due to the elimination of the requirement of adding excess organic substances to achieve denitrification in the water to be denitrified. The process according to the invention may thus be applied both to the purification of sewage water and to the preparation of potable water, and may be effected in conventional reactors used for denitrification, for example, trickling filters, fluidized or fixed bed reactors, or fully mixed activation basins. It is noted that by organic substances is meant substances containing carbon. Furthermore, the carrier employed is to be of the type adaptable for use in denitrification attached growth processes.

Preferably, biodegradable organic substances, which are at least partially insoluble in water, are employed to impregnate the carrier. More particularly, by partially insoluble is meant that when the organic substances are impregnated on the carrier, it will only go into solution in small amounts, i.e., in a localized fashion, adjacent the carrier materials sufficient to permit the denitrifying agents, i.e., bacteria, to synthesize them and to effect denitrification of the nitrates and nitrites. The organic substances thus do not, other than for these localized effects, actually enter into solution with the water being treated so that the $BOD_5$ is not detrimentally affected, i.e., increased to any appreciable degree.

The carrier which is impregnated with said substances is typically a non-surface active carrier material, i.e., physically and chemically inert in the water so that it will not deteriorate nor affect the quality of the water. In this manner, the entry and mixing of organic substances in the water to be denitrified is also adequately prevented, thereby avoiding the detrimental effects of the organic substances on the efflux quality.

Therefore, the organic substance is applied in a thin layer to the non-surface active carrier material by adhesion- or cohesion-power and the bacteria are growing on the organic substance. The nitrates and nitrites diffuse from the water in the bacteria layer. There the reduction process is then effected.

The amount of the organic substances which goes into solution in a localized fashion adjacent the carrier materials is neutralized by the bacteria so that the $BOD_5$ is not increased.

Examples of the at least partially water insoluble compounds that may serve as a carbon supply for the denitrification or denitrifying agents in the process of the invention are carbohydrates or cellulose. These may be applied in a thin layer, i.e., at least 0.1 mm, preferably 0.1–10 mm, more preferably 0.5–2 mm, to carrier materials that are not surface active, such as sand, gravel, plastic filler bodies, particles of polyurethane foam or porous mineral materials, such as lava slag or light expanded clay aggregate. A typical particle size for such materials lies between 1 and 100 mm referring to the diameter. But it is also possible to use some of the carrier materials as solid blocks. If porous mineral materials are used, a typical pore size is about 0.1–5 mm.

If, for example, polyurethane foam is used as the carrier material, the effective life of the substance on the carrier may be appreciably extended by filling the pore skeleton and thus, the entire volume of the carrier is filled completely with one of the aforementioned water insoluble substances. In the case when polyurethane foam is employed as the carrier material the typical particle size lies between 5 and 20 mm and the pore size between 0.5 and 3 mm.

Alternatively, the use of closed pore materials is also possible.

In addition to the aforementioned carrier materials, advantageously other non-surface active carrier materials which can be employed are urea-formaldehyde resin, and/or polyethylene, and/or polypropylene, and/or polyurethane and/or silicone polymers and/or natural sponges. These carrier materials have the advantage that they are physiologically harmless to eventual users of the treated water. Thus, they may be employed particularly in the denitrification of potable water.

It is preferable to use these carrier materials in an open cell, foamed or sintered lump form, thereby providing both the organic substances and the denitrifying agents, i.e., bacteria, with a large surface area to adhere to, which in view of the structure of the materials, ensures a stable accumulation. A typical particle size for such foamed or sintered particles lies again between 5 and 20 mm whereas a typical pore size lies between 0.5 and 3 mm.

In the case when cellulose is used as a carbon supply one alternative is the use of blocks of cellulosic material. Thus, this material would then serve both as carrier as well as a source of carbon itself.

Other organic substances which can be employed in the carrier material for preventing the contamination by the organic substances of the water to be denitrified, are water soluble, biodegradable compounds. In a more specific aspect the impregnation of these organic substances will be effected on an adsorbent, surface active carrier material. Examples of such water soluble, biodegradable substances are sugar, and/or gelatin, and/or starch, and/or alcohols, e.g., ethanol. These substances are physiologically harmless as discussed above. Furthermore, these substances are fixed in an adsorbent manner on the surface active carrier materials, such as activated charcoal or zeolite.

The adsorption of these substances on the surface active carrier material prevents the $BOD_5$ from being increased in the water being treated.

In the process of impregnating the carrier material, in a further development of the invention, it can be either immersed at least in part in a bath of the organic substance employed, or particles of a powder of an appropriate organic substance can be blown onto said carrier material. The choice of which of the two possible methods is used for the impregnation of the carrier material depends on the state of aggregation, solid or liquid, of the organic substance to be applied. If mixtures of the abovediscussed organic substances are to be applied to the carrier material, it may be appropriate under certain conditions to effect both methods, i.e., a bath and a blowing operation, in succession one to the other. By both the dry charging, i.e., blowing, as well as the immersion method, a thin layer of organic substance is provided on the carrier material prior to the introduction of the carrier into the reactor and of the water to be denitrified in the reactor.

In the case when the dry charging, i.e., blowing is used the powder of the organic substances becomes adhered to the carrier material because the powder has a different electrostatic charge as the carrier particles. The amount of impregnation into carrier material depends on the time of blowing, the porosity of the carrier material and on the electrostatic charge.

For the immersion method the amount of impregnation into the carrier material depends on the time which the carrier particles spend immersed in the liquid solution of the organic substances, on the concentration and viscosity of the liquid solution and on the degree of pressing of the carrier particles if they are in the flexible form.

The organic substances on the carrier are then available as a source of carbon to the denitrifying agents, i.e., organisms, growing during the course of the denitrification process, and which are also in certain instances deposited on the carrier material in addition to the organic substances, prior to introduction into the reactor. More particularly, in order to accelerate the beginning of the denitrification process, it advantageous under certain conditions to effect, in addition to the impregnation of the carrier material with organic substances, an impregnation with denitrifying agents, i.e., denitrifying organisms, and to feed the pretreated carrier material into the denitrification reactor only after this second impregnation with denitrifying agents. An already established culture is thus provided to effect denitrification rapidly.

In order to ensure a continuous denitrification process, in a further developement it is appropriate to withdraw carrier material from the denitrification reactor, either on a continuous basis, or in batches, to reimpregnate the carrier with the organic substances and reintroduce it into the dentrification reactor. This ensures the constant availability of a sufficient supply of carbon for the denitrifying agents to effect denitrification.

In the purification of potable water, it is also appropriate to pass the denitrified water, after its discharge from the denitrification reactor, through a filter to remove any biomass or unoxidized reducing agents that may still be present. In this case, one such filter can be a biologically operating, aerated microfilter. The filter may also consist of two stages. In example, sand filters known in the purification of potable water, may be used.

Without further elaboration, it is believed that one skilled in the art can, using the preceding description, utilize the present invention to its fullest extent.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the biological denitrification of water which is at least substantially free of carbon, and wherein the water is denitrified in a reactor in the presence of a carrier material supporting denitrifying microorganisms thereon, the improvement comprising conducting denitrification in a reactor in the presence of a carrier material which is not a carbon source for denitrifying microorganisms carried thereon and which is impregnated with organic substances separate from the carrier material in a manner such that the organic substances do not effectively enter into solution with the water being treated, with no substantial increase in BOD$_5$, said organic substances being biodegradable and at least partially insoluble in water and being employed as a carbon source by the denitrifying microorganisms, and the carrier material having been impregnated with said organic substances prior to being placed in the reactor for conducting the denitrification process whereby the requirement of providing a separate carbon source for the denitrifying microorganisms to effect denitrification is avoided, said carrier material being non-surface active and comprising at least one of sand, gravel, plastic filler bodies, porous mineral material, urea-formaldehyde resins, polyethylene, polypropylene, polyurethane, silicone polymers and natural sponges, and is in at least one of open-celled, foam and sintered lump form, and wherein influent water introduced into the reactor has a COD-content of about 1–200 mg/l.

2. A process according to claim 1 further comprising passing the water, after denitrification, through a biological filter to remove any biomass or non-oxidized reducing substance that may be present.

3. A process according to claim 1 further comprising removing the carrier material from the reactor after depletion of the organic substances thereon, reimpregnating the carrier materials with said organic substances, and reintroducing the carrier material into the reactor to continue conducting of denitrification.

4. A process according to claim 3, wherein said removal, reimpregnation and reintroduction of carrier material is conducted continuously.

5. A process according to claim 3, wherein said removal reimpregnation and reintroduction of carrier material is conducted on a batch basis.

6. A process according to claim 1 wherein the COD of the influent wastewater is about 1–50 mg/l.

7. A process according to claim 1 wherein said organic substances are applied in a thin layer of 0.1–10 mm on said carrier material.

8. A process according to claim 1 conducted with the carrier material of polyurethane foam particles of a size of about 5–20 mm having pores of about 0.5–3 mm which are impregnated with a thin layer of about 0.1–10 mm of carbohydrates or cellulose.

9. A process according to claim 1, wherein said carrier material comprises polyurethane foam.

10. A carrier for use in an attached growth biological denitrification process wherein said carrier is adapted for supporting denitrifying microorganisms thereon, and is not a carbon source for the denitrifying microorganisms and is impregnated with a separate organic substance to serve as a carbons source for said denitrifying microorganisms in a manner such that the organic substance will not dissolve into water when the carrier is immersed in water, said carrier being non-surface active and comprising one of sand, gravel, plastic filler bodies, particles of polyurethane foam, porous mineral materials, silicone polymers, natural sponges, ureaformaldehyde resins, polyethylene and polypropylene, and is in at least one of open-celled, foam and sintered lump form.

11. A carrier according to claim 10 comprising a nonsurface active material impregnated with a thin layer of at least one of carbohydrates and cellulose.

12. A carrier according to claim 11 wherein the carrier comprises polyurethane foam particles of a size of about 5–20 mm having pores of about 0.5–3 mm which are impregnated with a thin layer of about 0.1–10 mm of carbohydrates or cellulose.

13. A carrier according to claim 10, wherein said carrier comprises polyurethane foam.

14. A carrier according to claim 13, further comprising denitrifying microorganisms.

15. A carrier according to claim 10, further comprising denitrifying microorganisms.

* * * * *